United States Patent Office 3,354,233
Patented Nov. 21, 1967

3,354,233
PRODUCTION OF TETRAFLUOROETHYLENE
Louis G. Anello, Basking Ridge, and Cyril Woolf, Morristown, N.J., assignors to Allied Chemical Corporation, New York, N.Y., a corporation of New York
No Drawing. Filed Oct. 1, 1963, Ser. No. 312,855
The portion of the term of the patent subsequent to July 25, 1984, has been disclaimed
7 Claims. (Cl. 260—653.5)

This invention is directed to processes for preparing tetrafluoroethylene, $CF_2=CF_2$, a well known monomer.

Previously, tetrafluoroethylene has been made by zinc dechlorination of 1,2-dichlorotetrafluoroethane, $$CF_2ClCF_2Cl$$

and by pyrolysis of monochlorodifluoromethane. The former procedure is obviously uneconomic, while the latter process involves the disadvantage of necessary use of relatively high temperatures, e.g. 600–650° C. and usually above.

In this art, copper-chromium oxide catalysts have been used to effect reaction of hydrogen and certain organic carbon-fluorine-chlorine starting materials to effect formation of various other chlorofluorocarbons. However, with regard to such reactions, experience indicates, as to prior cooper-chromium oxide catalysts, good initial activity but relatively short catalyst life. In accordance with this invention, it has been found that an added alkaline earth component, such as barium oxide, promotes activity and substantially increases catalyst longevity. Further, we find that the herein described catalysts, which on the basis of constitution might be expected to cause addition of hydrogen to organic compounds, nevertheless unexpectedly not only effect removal by hydrogen of chlorine from certain chlorofluorocarbon starting materials but also effect perfluorination of certain organic starting materials and moreover do not cause saturation of unsaturated sought-for products. Hence, it has been found that tetrafluoroethylene may be prepared advantageously by reacting hydrogen with $CF_2ClCF_2Cl$ in vapor phase while in the presence of the herein catalysts. The invention provides an easily controllable, all gas-phase catalytic reaction which, we find further, may be carried out at ordinary pressure and at relatively low temperature. Major reaction appears to proceed in accordance with $$CF_2ClCF_2Cl + H_2 \rightarrow CF_2=CF_2 + 2HCl$$

In general practice of the invention process, a vaporous mixture of hydrogen and $CF_2ClCF_2Cl$ is passed, at temperatures substantially in the range of 350–450° C., thru a reactor charged with the catalysts described to thereby effect formation of $CF_2=CF_2$. The reactor exit gases—containing sought-for $CF_2=CF_2$, and some $CFCl=CF_2$ along with some unreacted hydrogen and $CF_2ClCF_2Cl$ organic starting material—may be handled by conventional methods to recover tetrafluoroethylene.

The dehydrochlorination catalysts employed in accordance with the invention may be considered as alkaline earth metal (including magnesium) oxide promoted copper chromites. Usually, the alkaline earth metal is selected from the group consisting of barium and calcium, and the preferred alkaline earth metal is barium. In general, these catalysts are derived and characterized by having been precipitated from solutions containing ammonium dichromate and soluble salts of copper and e.g. barium; decomposed or ignited at elevated temperatures to liberate nitrogen and water from the precipitated ammonium chromate; and subjected to heat treatment at elevated temperatures in the presence of hydrogen. Illustration of representative manufacture of suitable catalyst is given in the appended examples. The catalysts may be prepared by coprecipitation of copper and barium hydroxides along with ammonium chromate, from solutions of ammonium dichromate and the nitrates of copper and barium by addition of a solution of ammonium hydroxide, followed by filtering, washing, and drying the filter cake. In this circumstance the filter cake comprises a complex probably $Ba(OH)_2 \cdot 2Cu(OH)NH_4CrO_4$. Ammonium carbonate may be used as precipitating agent in which instance the filter cake comprises a complex of barium-ammonium-chromium carbonates. Constituents of the initial filter cakes may be ignited and decomposed to the oxides, via liberation of nitrogen and water, by heating in air, in such manner as to avoid violent gas evolution, for several hours at temperatures gradually rising to about 320–350° C. The decomposed material may be granulated, pressed into pellets or shaped into other desirable physical form. Prior to use as catalysts, the material may be placed in the reactor subsequently to be used for catalysis, and subjected to heat treatment in the presence of a stream of hydrogen while slowly raising temperature over a substantial period of time e.g. 3 to 5 hrs., up to say 300–400° C. To prevent excessive temperature rise and local overheating, hydrogen may be diluted with nitrogen or other inerts. The catalytic material both before and after hydrogen treatment is substantially black to dark brown, and there is no substantial change in color even after the material is used as a catalyst. In the finished catalyst, chromium is in the oxide form believed to be $Cr_2O_3$, and barium is thought to be in the form of BaO. The exact form of the copper in the finished catalysts, i.e. after hydrogen treatment, is not known. While during hydrogen treatment at elevated temperatures, it appears that chromium and barium remain in the unreduced forms, $Cr_2O_3$ and BaO, extent of reduction if any of copper oxide is not known. On the basis of the substantially black color of the finished catalysts, as distinguished from the red color of known copper-chromium oxide catalysts containing metallic copper, there is strong support for the conclusion that the copper of the catalysts is retained in the divalent state, belief that the presence of the alkaline earth metal inhibits or retards reduction of copper to metallic state. In view of the unknown condition of the copper, the materials employed as catalysts in practice of the invention are referred to as copper-oxide of chromium-barium oxide compounds.

Variable amounts of copper, chromium and barium salts may be employed in making the herein catalysts, and copper as Cu, chromium as Cr and barium as Ba contents in the finished catalysts may vary to correspondingly substantial extent. In the finished catalysts, weight ratio of Ba to Cr to Cu may vary considerably within the range of 1:1.5:15 to 1:8:9, preferably substantially in the range of 1:2:2 to 1:6:7.

The catalysts may be used in conjunction with suitable supports such as alkaline earth fluorides, magnesium fluoride, or refractory oxides such as silica, alumina, and magnesia. Porous supports may be mixed with the initial precipitates, the resulting mass dried and decomposed, and the material so prepared reduced with hydrogen in the reactor as described. Amounts of carrier material may vary in the range of 0.1–10, preferably 0.1–1.0 the weight of the combined copper-chromium oxide-barium oxide catalytic component. All of the catalysts employed are characterized by the fact that the $Cr_2O_3$ component is a highly active form of chromium oxide, such form resulting from the described preparation processes in which, prior to use as a catalyst, the material containing the $Cr_2O_3$ component is heated to temperatures not in excess of 400–425° C., i.e. temperatures above which chromium oxide increasingly converts to a nonactive form. The catalysts as used, disregarding any pellet binder incidentally present, preferably consist of copper-oxide of chromium-barium oxide, and may or may not be supported, and if supported preferably consist of copper-oxide of chromium-barium oxide and the support. These catalysts exhibit high initial activity with no perceptible decrease in activity after 50 hours of continuous use in reactions of the type herein described.

Suitable apparatus may comprise preferably a tubular reactor, made of nickel or other suitable material such as Inconel, Monel and stainless steel, mounted in a furnace provided with means for maintaining the reaction zone in the reactor at the desired elevated temperature. The reactor may include inlets for introduction of controlled amounts of hydrogen and vaporous $CF_2ClCF_2Cl$, and may be provided with a reaction product exit connected directly to the inlet of a product recovery system.

Temperatures in which reactions may be carried out are substantially in the range of 350–450° C., and preferably in the range of 375–430° C. At temperatures lower than about 350° C. little or no reaction is obtained, whereas at temperatures above about 450° C. no advantages accrue, and at temperatures above about 430° C. there is notable increase in thermocracking of the $CF_2ClCF_2Cl$ with formation of undesired byproducts.

The hydrogen and $CF_2ClCF_2Cl$ reactant may be mixed in any desired proportions. Hydrogen should be present in amount at least sufficient to react with a substantial amount of the starting material to form a substantial amount of $CF_2=CF_2$. An excess of hydrogen or equimolecular proportions may be employed. Ordinarily, the quantity of hydrogen lies in the range of 0.75–1.25 mols per mol of $CF_2ClCF_2Cl$. In large scale work, it is advantageous and preferable to adjust ratios of reactants, reaction temperatures and residence time so that hydrogen is substantially completely reacted, and hence it is preferred to utilize a little less than equivalent proportions of hydrogen even if recycling of larger amounts of $CF_2ClCF_2Cl$ becomes necessary.

Contact time may vary considerably in the range of 0.1 to 50, preferably 5 to 10 seconds. Reaction rate at the temperatures specified is usually quite rapid, so that contact time is not particularly critical and depending upon particular operating conditions at hand may be determined by test run.

While sub- or super-atmospheric pressure may be employed, the invention affords the advantage of operation at substantially atmospheric pressure, and preferred modifications embody use of substantially atmospheric pressure. It will be understood that in the practice of gas-phase processes of the general type described herein, i.e. processes in which a gas stream is flowed successively through reaction and product recovery systems, for all practical purposes, as relate to reactions themselves, pressure is considered as being substantially atmospheric. Actually, however, pressures in such systems are sufficiently on the positive side to effect commercially satisfactory gas flow thru the apparatus train. Thus, depending upon factors such as apparatus design, unpacked gas space in the reactor, desired contact time, etc., actual pressures in systems of the kind under consideration may vary from 2 up to say 10–15 pounds gauge, and accordingly operations of this type are included in the designation of substantially atmospheric pressure.

Products exiting the reaction zone comprise sought for product $CF_2=CF_2$ and some $CClF=CF_2$ together with any unreacted $CF_2ClCF_2Cl$ and possibly some hydrogen. The reactor exit may be water-scrubbed to remove HCl and HF, passed through an aqueous NaOH solution to remove traces of residual acid, and dried as by $CaCl_2$. The organic portions of the reactor exit may be isolated by suitable cooling, as in a liquid nitrogen trap. By this procedure, unreacted hydrogen passes thru the trap while organics are considered in the trap. The $CF_2=CF_2$ product may be recovered from the condensate by fractional distillation.

The following illustrate practice of the invention. Conversions and yields are given in mol percent. Conversions are obtained by dividing mols of organic starting material consumed by mols of starting material fed, multiplied by 100; and yields, based on starting material converted to other products, are obtained by dividing mols of sought-for product by mols of starting material consumed, multiplied by 100.

*Example 1.*—A copper-chromium oxide-barium oxide catalyst was prepared as follows. To about 900 ml. of water containing 260 g. $Cu(NO_3)_2 \cdot 3H_2O$ and 31 g. $Ba(NO_3)_2$ at about 80° C. were added with stirring about 900 ml. of water solution containing 151 g. $(NH_4)_2Cr_2O_7$ and 225 ml. of 28% ammonium hydroxide. The resulting precipitate, comprising a complex of copper and barium hydroxides and ammonium chromate, $NH_4CrO_4$, was filtered. The cake was pressed, sucked dry, dried in an oven at about 80° C. for 12 hours, and pulverized to about 8–10 mesh. This granular material was subjected to decomposition by heating the same in open air, in such manner as to avoid violent reaction, at temperature of about 320–340° C., while stirring. Decomposition, involving evolution of nitrogen and water, was continued until the color of the material changed from orange thru brown to black. On cessation of gas evolution, the material contained by weight as CuO, about 43%; as $Cr_2O_3$, 46%; as BaO, 9.1%. Ba to Cr to Cu weight ratio was about 1:5:4.7. The material was pelletized to about 1/8″ x 1/8″ pellets. About 120 ml. of pelleted material were charged into a 5/8″ I.D. tubular alundum reactor, externally heated over 30″ of length by an electric furnace provided with an automatic temperature control, the material being disposed in a central 22″ length of the reactor. The material was treated by heating for about 4 hours at temperatures gradually increasing from 150° C. to about 400° C. while in the presence of a stream of hydrogen. The Ba to Cr to Cu weight ratio of the finished catalyst was the same as before hydrogen treatment, i.e. about 1:5:4.7. Temperature in the reactor was thereafter held at about 400° C., and a mixture consisting of about 274 g. (1.6 m.) of $CF_2ClCF_2Cl$ (B.P. 3.5° C.) organic starting material and about 1.4 mols (33.5 liters) of hydrogen were passed into and thru the reactor at a substantially constant rate during a period of about 3.5 hrs., contact time being 10 seconds. Exit products of the reactor were passed thru a water scrubber to remove most of HCl and HF, thru an aqueous 10% NaOH solution to remove traces of residual acid, thru a CaCl drying tower, and finally into a liquid nitrogen cooled trap in which the organics are condensed and collected, unreacted hydrogen exiting the cold trap. Fractional distillation of the cold trap liquid resulted in the recovery of about 26 g. (0.26 m.) of sought-for $CF_2=CF_2$ product (B.P. minus 76.3° C.); 11 g. (0.095 ml.) of $CFCl=CF_2$ (B.P. minus 26.2° C.); and 205 g. (1.2 m.) of $CF_2ClCF_2Cl$ starting material. Conversion of organic starting material to other products was about 25%, and yield of $CF_2=CF_2$, on the basis of the organic starting material converted, was about 65%.

*Example 2.*—The catalyst employed, initially in the form of 1/8″ x 1/8″ pellets, contained by weight about 19.5% binder; as CuO, 33%; as $Cr_2O_3$, 38%; and as BaO, 9.5%. Ba to Cr to Cu weight ratio was about 1:3:3. This material was made by procedure similar to that described in Example 1. Before use, 120 ml. of the material was boiled in water for about half an hour, to remove some of the sodium silicate binder, and then air-dried at about 125° C., the material still retaining the pellet form. The pellets were then treated with hydrogen at about 350° C. for about 5 hours. The Ba to Cr to Cu weight ratio of the finished catalyst was the same as before hydrogen treatment. A vaporous mixture consisting of 229 g. (1.64 m.) $CF_2ClCF_2Cl$ and 1.32 m. (31.5 liters) of hydrogen were reacted, during a period of 4 hours, substantially as described in Example 1. On fractional distillation of condensate caught in the liquid nitrogen cold trap, there were obtained about 28 g. (0.28 m.) of $CF_2=CF_2$; 14 g. (0.12 m.) of $CFCl=CF_2$, and about 202 g. (1.18 m.) of unreacted $CF_2ClCF_2Cl$ starting material. Conversion of starting material was about 17%, and yield was about 61%.

*Example 3.*—The catalyst employed was prepared and had substantially the same composition as the catalyst of Example 2. A vaporous mixture consisting of about 335 g. (1.96 m.) $CF_2ClCF_2Cl$ and 2.0 mol (48 liters) of hydrogen were reacted, during a period of 5 hours, substantially in accordance with the procedure of Example 1 except that, throughout the run, temperature in the reactor was maintained at about 425° C. On fractional distillation of the liquid nitrogen trap condensate there were recovered about 42.5 g. (0.43 m.) of $CF_2=CF_2$, 22 g. (0.19 m.) of $CFCl=CF_2$, and 214 g. (1.26 m.) of unreacted $CF_2ClCF_2Cl$ starting material. Conversion was about 28.1%, and yield was about 61%.

In all of the above runs, pressure in the reactor was about 2 p.s.i.g., i.e. substantially atmospheric.

We claim:

1. The process for making tetrafluoroethylene which comprises subjecting $CF_2ClCF_2Cl$ in a reaction zone to the action of hydrogen in a quantity sufficient to react with a substantial amount of said $CF_2ClCF_2Cl$ while maintaing a temperature substantially in the range of 350–450° C. and while in the presence of a catalyst which has been precipitated from a solution containing ammonium dichromate, a soluble salt of copper and a soluble salt of an alkaline earth metal, which precipitated catalyst has been ignited at elevated temperatures to liberate nitrogen and water until the precipitated catalyst becomes substantially dark brown to black in color, and recovering $CF_2=CF_2$ from the resulting reaction product.

2. The process for making tetrafluoroethylene which comprises subjecting $CF_2ClCF_2Cl$ in a reaction zone to the action of hydrogen in a quantity sufficient to react with a substantial amount of said $CF_2ClCF_2Cl$ while maintaining a temperature substantially in the range of 350–450° C. and while in the presence of a catalyst which has been precipitated from a solution containing ammonium dichromate, a soluble salt of copper and a soluble salt of barium, which precipitated catalyst has been ignited at elevated temperatures to liberate nitrogen and water until the precipitated catalyst becomes substantially dark brown to black in color, and recovering $CF_2=CF_2$ from the resulting reaction product.

3. The process for making tetrafluoroethylene which comprises subjecting $CF_2ClCF_2Cl$ in a reaction zone to the action of hydrogen in a quantity sufficient to react with a substantial amount of said $CF_2ClCF_2Cl$ while maintaining a temperture substantially in the range of 350–450° C. and while in the presence of a catalyst which has been precipitated from a solution containing ammonium dichromate, a soluble salt of copper and a soluble salt of barium, which precipitated catalyst has been ignited at elevated temperatures to liberate nitrogen and water until the precipitated catalyst becomes substantially dark brown to black in color, in which precipitated and ignited catalyst the weight ratio of Ba:Cr:Cu is substantially in the range of 1:2:2 to 1:6:7, and recovering $CF_2=CF_2$ from the resulting reaction product.

4. The process of claim 2 in which the weight ratio of Ba:Cr:Cu in the catalyst is substantially in the range of 1:1.5:1.5 to 1:8:9.

5. The process of claim 1 in which temperature is maintained substantially in the range of 375–430° C.

6. The process of claim 1 in which the quantity of hydrogen lies substantially in the range of 0.75–1.25 mols of hydrogen per mol of $CF_2ClCF_2Cl$.

7. The process of claim 3 in which temperature is maintained substantially in the range of 375–430° C., and pressure is substantially atmospheric.

References Cited

UNITED STATES PATENTS 2,697,124   12/1954   Mantell _____ 260—653.5

FOREIGN PATENTS 577,179   6/1959   Canada.
1,163,323   9/1958   France.

D. D. HORWITZ, *Primary Examiner.*